US012624670B2

(12) United States Patent
Mitani

(10) Patent No.: US 12,624,670 B2
(45) Date of Patent: May 12, 2026

(54) INJECTOR CONTROLLER

(71) Applicant: TOYOTA JIDOSHA KABUSHIKI KAISHA, Toyota (JP)

(72) Inventor: Shinichi Mitani, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/966,509

(22) Filed: Dec. 3, 2024

(65) Prior Publication Data

US 2025/0179969 A1 Jun. 5, 2025

(30) Foreign Application Priority Data

Dec. 5, 2023 (JP) ................................ 2023-205271

(51) Int. Cl.
*B60T 7/12* (2006.01)
*F02D 41/30* (2006.01)
*F02D 41/40* (2006.01)

(52) U.S. Cl.
CPC ........... *F02D 41/401* (2013.01); *F02D 41/30* (2013.01)

(58) Field of Classification Search
CPC ................. F02D 41/402; F02D 41/401; F02D 2041/389; F02D 41/025; F02D 41/047; F02P 5/045
USPC .......................................................... 701/105
See application file for complete search history.

(56) References Cited

U.S. PATENT DOCUMENTS 9,587,577 B2 * 3/2017 Nakano ................. F02P 5/1502
10,344,702 B2 * 7/2019 Yacoub ................. F02D 41/401
11,674,464 B2 * 6/2023 Zhang ..................... F02D 41/40 701/105
2010/0023241 A1 * 1/2010 Guo ...................... F02D 41/402 60/285
2018/0306106 A1 * 10/2018 Glugla .................... F02D 15/02
2021/0062709 A1 * 3/2021 Takayama ............ F02D 41/021
2021/0071615 A1 * 3/2021 Matsubara .............. F02D 41/10
2021/0301755 A1 * 9/2021 Hata ..................... F02D 35/026
2023/0105260 A1 * 4/2023 Fujii ..................... F02D 41/401 701/105

(Continued)

FOREIGN PATENT DOCUMENTS

JP H 11-241626 A 9/1999
JP 2017-020356 A 1/2017

(Continued)

*Primary Examiner* — Hung Q Nguyen
*Assistant Examiner* — James J Kim
(74) *Attorney, Agent, or Firm* — Finnegan, Henderson, Farabow, Garrett, and Dunner, LLP

(57) ABSTRACT

A controller includes a processor and memory. The memory stores, as a crank angular range in which fuel injection from the injector is permitted, a first injection range specified in the crank angular range from a start time of an intake stroke to an end time of the intake stroke and a second injection range specified in the crank angular range from a start time of a compression stroke to an end time of the compression stroke. The processor executes a first injection process that causes the injector to perform fuel injection in the first injection range and a second injection process that causes the injector to perform fuel injection in the second injection range B. The second injection range is discontinuous with the first injection range and is narrower than the first injection range.

8 Claims, 6 Drawing Sheets

(56) References Cited

U.S. PATENT DOCUMENTS

2024/0044302 A1* 2/2024 Suganuma ............ F02D 41/402

FOREIGN PATENT DOCUMENTS

| | | | |
|---|---|---|---|
| JP | 2019-218881 | A | 12/2019 |
| JP | 2021-050641 | A | 4/2021 |
| JP | 2021-161970 | A | 10/2021 |

* cited by examiner

INJECTOR CONTROLLER

CROSS-REFERENCE TO RELATED APPLICATIONS

This application is based upon and claims the benefit of priority from prior Japanese Patent Application No. 2023-205271, filed on Dec. 5, 2023, the entire contents of which are incorporated herein by reference.

BACKGROUND

1. Field

The present disclosure relates to an injector controller.

2. Description of Related Art

Japanese Laid-Open Patent Publication No. 11-241626 discloses an internal combustion engine including cylinders, pistons, and injectors. Each cylinder is a space for burning an air-fuel mixture of intake air and fuel. The pistons are respectively arranged in the cylinders. Each piston reciprocates in the cylinder in accordance with the combustion of the air-fuel mixture. Each injector directly injects fuel into the cylinder from a side corresponding to top dead center of the piston.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As described in the above publication, in the technique for directly injecting fuel into the cylinder, the fuel may collect on a top surface of the piston and a wall surface of the cylinder. The fuel collected on the top surface of the piston facilitates production of particulate matter during combustion in the combustion stroke. The fuel remaining on the wall surface of the cylinder is, for example, vaporized in the cylinder in the exhaust stroke. The fuel vaporized in the exhaust stroke is discharged out of the cylinder as unburned hydrocarbon. To reduce both the particulate matter and the unburned hydrocarbon, there is need for a technique that controls the amount of fuel collected on the top surface of the piston and the amount of fuel collected on the wall surface of the cylinder under an excessive amount.

In an aspect of the present disclosure, an injector controller is configured to control an injector performing fuel injection into a cylinder of an internal combustion engine from a side corresponding to top dead center of a piston. The injector controller includes a processor and a memory. The memory is configured to store, as a crank angular range in which fuel injection from the injector is permitted, a first injection range specified in advance in a crank angular range from a start time of an intake stroke to an end time of the intake stroke and a second injection range specified in advance in a crank angular range from a start time of a compression stroke to an end time of the compression stroke. The processor is configured to execute a first injection process that causes the injector to perform fuel injection in the first injection range and a second injection process that causes the injector to perform fuel injection in the second injection range. The second injection range is discontinuous with the first injection range and is narrower than the first injection range.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of a controller for an injector will now be described with reference to the drawings.

Schematic Structure of Internal Combustion Engine

Figure 1:
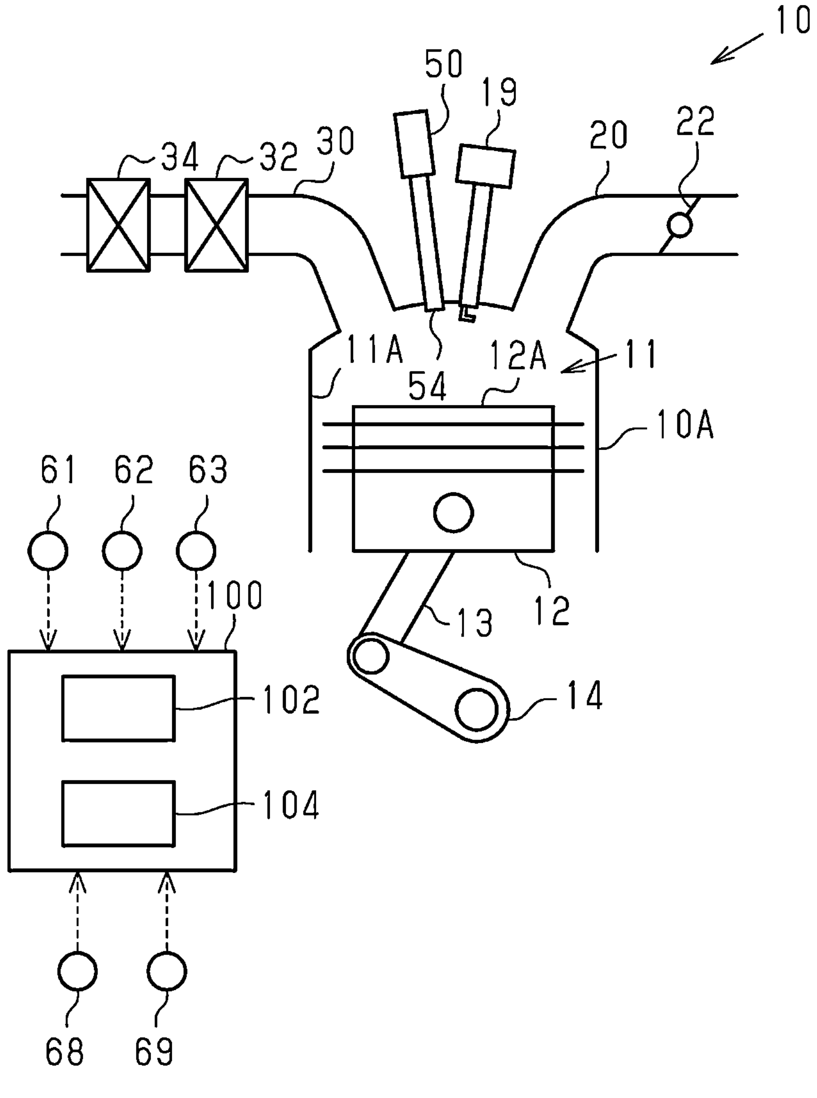
FIG. 1 is a schematic diagram showing the structure of an internal combustion engine.

As shown in FIG. 1, a vehicle includes an internal combustion engine 10. The internal combustion engine 10 is a driving source for the vehicle. The internal combustion engine 10 includes an engine main body 10A, cylinders 11, pistons 12, connecting rods 13, and a crankshaft 14. FIG. 1 shows only one of the cylinders 11. In the same manner as the cylinders 11, one of the pistons 12 and one of the connecting rods 13 are shown. The piston 12 and the connecting rod 13 are disposed in each cylinder 11. The number of the cylinders 11 is four.

The cylinders 11 are spaces defined in the engine main body 10A. The cylinders 11 are spaces for burning an air-fuel mixture of fuel and intake air. The cylinders 11 are cylindrical. The engine main body 10A includes a wall surface defining the cylinders 11. Hereafter, the wall surface of the engine main body 10A is referred to as a wall surface 11A of the cylinders 11. Although not shown, the engine main body 10A includes a coolant passage extending around the cylinders 11 to allow coolant to flow.

The pistons 12 are respectively arranged in the cylinders 11. The pistons 12 are cylindrical. The outer diameter of each piston 12 is substantially equal to the inner diameter of the cylinder 11. The center axis of the piston 12 substantially coincides with the center axis of the cylinder 11. The connecting rod 13 is coupled to the piston 12. The crankshaft 14 is coupled to the connecting rod 13. The piston 12 reciprocates in the cylinder 11 in a direction extending along the center axis. The crankshaft 14 rotates as the piston 12 reciprocates. When the piston 12 reciprocates in the cylinder 11, the piston 12 moves toward and away from the crankshaft 14. More specifically, the piston 12 moves between top dead center, which is most distant from the crankshaft 14, and bottom dead center, which is closest to the crankshaft 14. Hereafter, the direction in which the piston 12 moves to the side corresponding to top dead center may be referred to as the upper side, and the opposite direction may be referred to as the lower side. One of the two end surfaces of the piston 12 in the direction extending along the center axis that faces upward is referred to as a top surface 12A.

The internal combustion engine 10 includes injectors 50. In FIG. 1, only one of the injectors 50 is shown. The injector 50 is disposed in each cylinder 11. The injector 50 is arranged on the cylinder 11 above the piston 12. The outer shape of each injector 50 is cylindrical. In the present embodiment, the center axis of the injector 50 is substantially parallel to the center axis of the cylinder 11. The injector 50 includes a distal end disposed in the cylinder 11. The distal end of the injector 50 is located above top dead center of the piston 12. The distal end of the injector 50 includes an injection port 54 opposed to the top surface 12A of the piston 12. The injector 50 performs fuel injection into the cylinder 11 from the side corresponding to top dead center of the pistons 12. As described above, the injector 50 directly injects fuel into the cylinder 11 without using an intake passage 20. The injector 50 injects gasoline as the fuel.

The internal combustion engine 10 includes ignition plugs 19. In FIG. 1, only one of the ignition plugs 19 is shown. The ignition plug 19 is disposed in each cylinder 11. The ignition plug 19 includes a distal end disposed in the cylinder 11. The ignition plug 19 ignites the air-fuel mixture in the cylinder 11.

The internal combustion engine 10 includes the intake passage 20 and a throttle valve 22. The intake passage 20 is a passage into which intake air is drawn into the cylinders 11. The intake passage 20 is connected to each cylinder 11. The throttle valve 22 is disposed in the intake passage 20. The open degree of the throttle valve 22 is adjustable. Thus, an intake air amount varies depending on the open degree of the throttle valve 22.

The internal combustion engine 10 includes an exhaust passage 30, a three-way catalyst 32, and a particulate filter 34. The exhaust passage 30 is a passage that discharges exhaust gas from the cylinders 11. The exhaust passage 30 is connected to each cylinder 11. The three-way catalyst 32 is disposed in the exhaust passage 30. The three-way catalyst 32 removes hydrocarbon, carbon monoxide, and nitrogen oxide from the exhaust gas. The particulate filter 34 is disposed downstream of the three-way catalyst 32 in the exhaust passage 30. The particulate filter 34 collects particulate matter contained in the exhaust gas.

The internal combustion engine 10 is a four-stroke cycle engine in which a 720° rotation of the crankshaft 14 completes one cycle of the intake stroke, the compression stroke, the combustion stroke, and the expansion stroke in each cylinder 11. Focusing on one cylinder 11, the intake stroke is a period in which the piston 12 moves from top dead center to bottom dead center in the cylinder 11. The compression stroke is a period, following the intake stroke, in which the piston 12 moves from bottom dead center to top dead center. The combustion stroke is a period, following the compression stroke, in which the piston 12 moves from top dead center to bottom dead center. The exhaust stroke is a period, following the combustion stroke, in which the piston 12 moves from bottom dead center to top dead center. After the exhaust stroke, the intake stroke is performed in the next cycle.

The internal combustion engine 10 includes a crank angle sensor 61, an air flow meter 62, and a water temperature sensor 63. The crank angle sensor 61 detects a crank angle, which is a rotational angle of the crankshaft 14. The air flow meter 62 detects the intake air amount. The water temperature sensor 63 detects the temperature of the coolant at the outlet of the coolant passage. The sensors 61, 62, and 63 each repeatedly transmit a signal corresponding to the detected information to a controller 100 (described later).

The vehicle includes an acceleration sensor 68 and a vehicle speed sensor 69. The acceleration sensor 68 detects a depression amount of an accelerator pedal in the vehicle as an accelerator operation amount. The vehicle speed sensor 69 detects a traveling speed of the vehicle as vehicle speed. The sensors 68 and 69 each repeatedly transmit a signal corresponding to the detected information to the controller 100 (described later).

Overview of Controller

The vehicle includes the controller 100. The controller 100 includes processing circuitry including a CPU 102 and memory 104. The CPU 102 corresponds to a processor. The memory 104 includes three types, namely, random access memory (RAM), read only memory (ROM), and electrically rewritable nonvolatile memory. In the present embodiment, these three types are collectively referred as the memory 104. The memory 104 stores in advance various programs that define processes executed by the CPU 102. Also, the memory 104 stores in advance various types of data used when the CPU 102 runs the programs.

The CPU 102 repeatedly receives detection signals from the sensors 61, 62, 63, 68, and 69 mounted on the vehicle. The CPU 102 calculates the following parameters based on the detection signals received from the sensors 61, 62, 63, 68, and 69 at an appropriate time. The CPU 102 calculates an engine rotation speed, which is rotational speed of the crankshaft 14, based on changes in the crank angle received from the crank angle sensor 61. The CPU 102 calculates an engine load rate based on the engine rotation speed and an intake air amount received from the air flow meter 62. The engine load rate is a parameter that determines the amount of air filling the cylinders 11, and is a value obtained by dividing the amount of air flowing into one cylinder 11 per one cycle of the internal combustion engine 10 by a reference air amount. The reference air amount changes depending on the engine rotation speed.

The CPU 102 controls the internal combustion engine 10. The CPU 102 executes various controls on the internal combustion engine 10 based on a parameter such as the accelerator depression amount, the vehicle speed, the engine rotation speed, or the engine load rate. For example, the CPU 102 executes various controls such as an injection control of the injectors 50, an ignition timing control of the ignition plugs 19, and an open degree adjustment control of the throttle valve 22. By executing such controls, the CPU 102 sequentially burns the air-fuel mixture in the cylinders 11.

Figure 2:
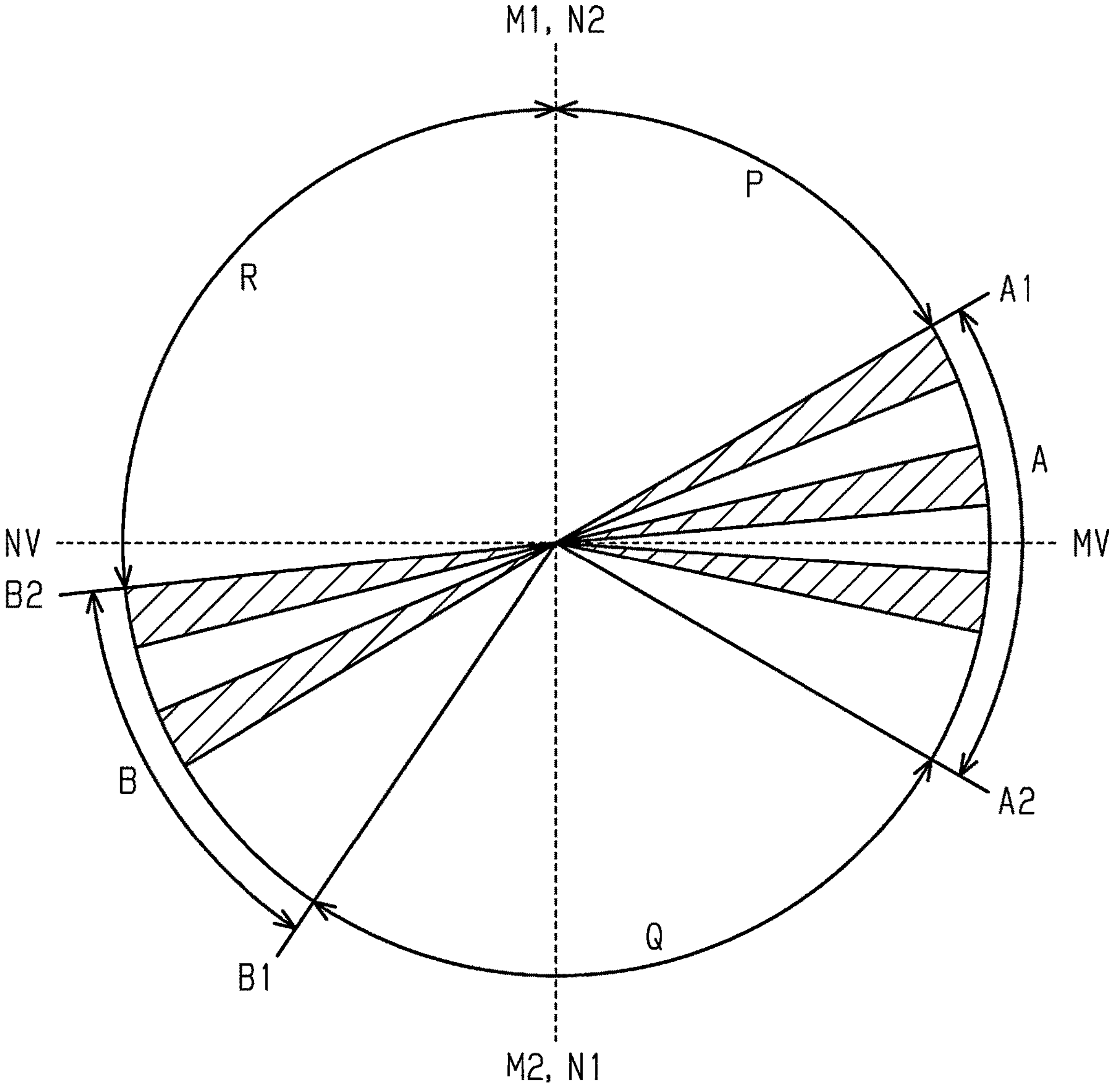
FIG. 2 is schematic diagram showing a first injection range and a second injection range.

The CPU 102 is configured to execute a specific injection control. The specific injection control is executed when the internal combustion engine 10 is cold. As shown in FIG. 2, the memory 104 stores in advance injection permission information that includes a crank angular range defining permission and prohibition of a fuel injection and is used in the specific injection control. In FIG. 2, the crank angle of a specified one of the cylinders 11 is expressed by an angle of a clockwise circle from a start time M1 of an intake stroke to an end time N2 of a compression stroke. In the following description, the crank angle of the specified cylinder 11 is zero degrees at the start time M1 of the intake stroke. The range from the start time M1 of the intake stroke to the end time N2 of the compression stroke refers to a range including the start time M1 and the end time N2. In the same manner, referring to other ranges, each range includes the start time and the end time.

The memory 104 stores a first injection range A as the injection permission information. The first injection range A refers to a crank angular range in which a fuel injection from the injector 50 is permitted. The first injection range A is determined in advance within a crank angular range from the start time M1 of the intake stroke to an end time M2 of the intake stroke. That is, the memory 104 stores a crank angle corresponding to a start A1 of the first injection range A and a crank angle corresponding to an end A2 of the first injection range A. In the following description, a time, a range, and the like of fuel injection of the injector 50 are described using the unit of a crank angle, unless otherwise specified. The start time M1 of the intake stroke refers to a point in time when the piston 12 is located at top dead center. The end time M2 of the intake stroke refers to a point in time when the piston 12 is located at bottom dead center.

The start A1 of the first injection range A is located at a retard side with respect to the start time M1 of the intake stroke and an advance side with respect to a center MV of the intake stroke. The advance refers to an angle behind a certain crank angle. The retard refers to an angle ahead of the certain crank angle. The start A1 of the first injection range A is located at, for example, a crank angle of approximately 60 degrees. The start A1 of the first injection range A is determined taking into consideration the amount of fuel injected from the injector 50 and collected on the top surface 12A of the piston 12. The amount of fuel injected from the injector 50 and collected on the top surface 12A of the piston 12 increases as the piston 12 is located closer to the injector 50 when the injector 50 injects fuel; that is, as the piston 12 is located closer to top dead center. The start A1 of the first injection range A is determined in advance by, for example, tests or simulations as a limit crank angle in the crank angular range of the intake stroke at which the amount of fuel collected on the top surface 12A of the piston 12 is limited to a first tolerance value or less. The first tolerance value may be determined as a value at which the amount of particular matter generated is limited to a fixed amount or less. The start A1 of the first injection range A is determined taking into consideration a cylinder state such as the distance between the piston 12 and the injector 50 at each crank angle, the movement direction of the piston 12, and in-cylinder pressure that is pressure of the cylinder 11.

The end A2 of the first injection range A is located at a retard side with respect to the center MV of the intake stroke and advance side with respect to the end time M2 of the intake stroke. The end A2 of the first injection range A is located at, for example, a crank angle of approximately 120 degrees. The end A2 of the first injection range A is determined taking into consideration the amount of fuel injected from the injector 50 and collected on the wall surface 11A of the cylinder 11. The amount of fuel injected from the injector 50 and collected on the wall surface 11A of the cylinder 11 increases as the area of the wall surface 11A exposed when the injector 50 injects fuel increases; that is, as the piston 12 is located closer to bottom dead center. The end A2 of the first injection range A is determined in advance taking into consideration the above-described cylinder state by, for example, tests or simulations as a limit crank angle in the crank angular range of the intake stroke at which the amount of fuel collected on the wall surface 11A of the cylinder 11 is limited to a second tolerance value or less. The second tolerance value may be determined as a value at which the amount of hydrocarbon that is unburned and discharged from the cylinder 11 is limited to a certain amount or less.

The memory 104 stores a second injection range B as the injection permission information. Like the first injection range A, the second injection range B refers to a crank angular range in which fuel injection from the injector 50 is permitted. The second injection range B is determined in advance within a crank angular range from the start time N1 of a compression stroke to the end time N2 of the compression stroke. The second injection range B is discontinuous with the first injection range A and is separated from the first injection range A. That is, the memory 104 stores a crank angle corresponding to a start B1 of the second injection range B and a crank angle corresponding to an end B2 of the second injection range B. The start time N1 of the compression stroke refers to a point in time when the piston 12 is located at bottom dead center. The end time N2 of the compression stroke refers to a point in time when the piston 12 is located at top dead center.

The start B1 of the second injection range B is located at a retard side with respect to the crank angle corresponding to the start time N1 of the compression stroke and an advance side with respect to a center NV of the compression stroke. The start B1 of the second injection range B is located at, for example, a crank angle of approximately 220 degrees. Like the end A2 of the first injection range A, the start B1 of the second injection range B is determined taking into consideration the amount of fuel injected from the injector 50 and collected on the wall surface 11A of the cylinder 11. More specifically, the start B1 of the second injection range B is determined in advance taking into consideration the above-described cylinder state by, for example, tests or simulations as a limit crank angle in the crank angular range of the compression stroke at which the amount of fuel collected on the wall surface 11A of the cylinder 11 is limited to the second tolerance value or less. When the end time M2 of the intake stroke is a reference, the start B1 of the second injection range B is asymmetrical with the end A2 of the first injection range A. More specifically, the start B1 of the second injection range B is located closer to the end time M2 of the intake stroke than the end A2 of the first injection range A is.

The end B2 of the second injection range B is located at an advance side with respect to the crank angle corresponding to the center NV of the compression stroke. The end B2 of the second injection range B is located at, for example, a crank angle of approximately 260 degrees. Like the start A1 of the first injection range A, the end B2 of the second injection range B is determined taking into consideration the amount of fuel injected from the injector 50 and collected on the top surface 12A of the piston 12. More specifically, the end B2 of the second injection range B is determined in advance taking into consideration the above-described cylinder state by, for example, tests or simulations as a limit crank angle in the crank angular range of the compression stroke at which the amount of fuel collected on the top surface 12A of the piston 12 is limited to the first tolerance value or less. As described above, the end B2 of the second injection range B is located at an advance side with respect to the crank angle corresponding to the center NV of the compression stroke. This setting is compared with the start A1 of the first injection range A as follows. When the end time M2 of the intake stroke is a reference, the end B2 of the second injection range B is asymmetrical with the start A1 of the first injection range A. More specifically, the end B2 of the second injection range B is located closer to the end time M2 of the intake stroke than the start A1 of the first injection range A is.

The crank angular range from the start time M1 of the intake stroke to the start A1 of the first injection range A is referred to as a first predetermined range P. The crank angular range from the end A2 of the first injection range A to the start B1 of the second injection range B is referred to as a second predetermined range Q. The crank angular range from the end B2 of the second injection range B to the end time N2 of the compression stroke is referred to as a third predetermined range R. The three predetermined ranges each correspond to a crank angular range in which the injector 50 is prohibited from injecting fuel. However, the start A1 of the first injection range A, the end A2 of the first injection range A, the start B1 of the second injection range B, and the end B2 of the second injection range B each correspond to a point in time when the fuel injection is permitted. When defined as described above, the first injection range A and the second injection range B satisfy the following two conditions (L1) and (L2).

(L1) The second injection range B is narrower than the first injection range A.

(L2) The sum of the first predetermined range P and the third predetermined range R is greater than the second predetermined range Q.

Detail of Specific Injection Control

The specific injection control will now be described in detail. In the specific injection control, the CPU 102 causes the injector 50 in a cylinder 11 to perform fuel injection multiple times during one cycle of the internal combustion engine 10. To realize such multi-time fuel injection, the CPU 102 is configured to execute a first injection process and a second injection process as a part of the specific injection control. In the first injection process, the CPU 102 causes the injector 50 in the cylinder 11 to perform fuel injection one or more times in the first injection range A. In the second injection process, the CPU 102 causes the injector 50 in the cylinder 11 to perform fuel injection one or more times in the second injection range B. In the first injection process, the CPU 102 generally starts fuel injection at a retard side with respect to the crank angle corresponding to the center of the first injection range A fewer times than at an advance side with respect to the crank angle corresponding to the center of the first injection range A. In the second injection process, the CPU 102 generally starts fuel injection at an advance side with respect to the crank angle corresponding to the center of the second injection range B fewer times than at a retard side with respect to the crank angle corresponding to the center of the second injection range B.

The procedure of the specific injection control will now be specifically described. While the internal combustion engine 10 is running, if a predetermined execution condition is satisfied, the CPU 102 starts the specific injection control in a predetermined control cycle. The execution condition is satisfied when the temperature of the coolant detected by the water temperature sensor 63 is less than or equal to a predetermined temperature. The temperature of the coolant reflects the temperature inside the cylinder 11. The predetermined temperature is determined by, for example, tests or simulations as an upper limit temperature at which fuel is not likely to evaporate in the cylinder 11.

Figure 3:
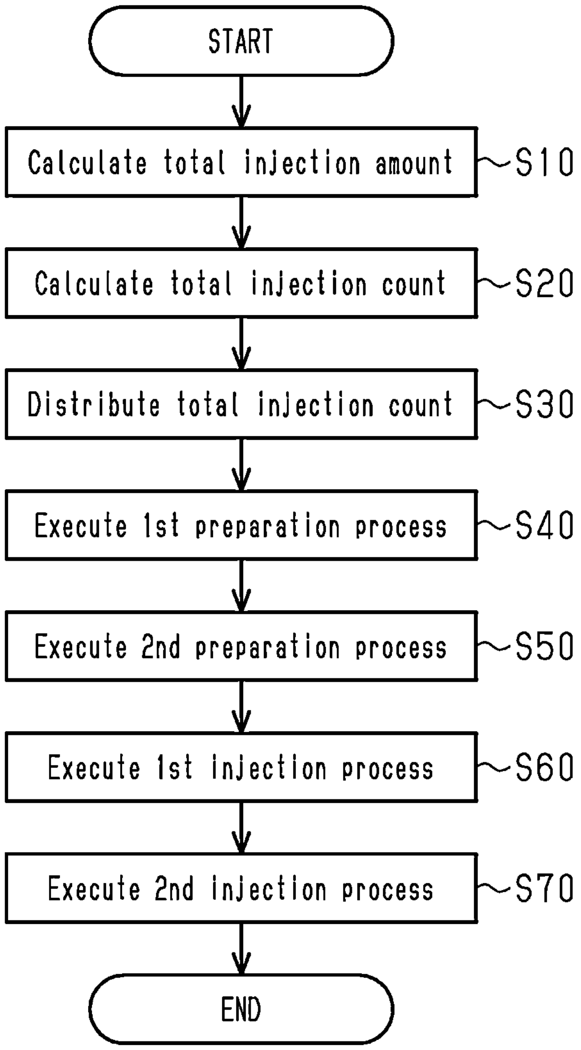
FIG. 3 is a flowchart showing the procedure of a process of a specific injection control.

As shown in FIG. 3, when starting the specific injection control, the CPU 102 executes step S10. In step S10, the CPU 102 calculates a total injection amount that a cylinder 11 needs during one cycle of the internal combustion engine 10. The CPU 102 calculates the total injection amount based on parameters such as request torque of the internal combustion engine 10 determined from the accelerator operation amount and the vehicle speed and operating states of the internal combustion engine 10 such as the engine rotation speed and the engine load rate. The CPU 102 calculates the total injection amount based on the most recent values of the parameters such as the accelerator depression amount, the vehicle speed, the engine rotation speed, and the engine load rate. The CPU 102 calculates the total injection amount and then proceeds to step S20. The process of step S10 is a total injection amount calculating process.

In step S20, the CPU 102 calculates a total injection count, which is the number of times that an injector 50 injects fuel during one cycle of the internal combustion engine 10. The CPU 102 divides the newest total injection amount, which is calculated in step S10, by the minimum injection amount stored in the memory 104 and rounds off the fractional part of the divided value to calculate the total injection count. The minimum injection amount is the minimum amount of fuel that the injector 50 is capable of injecting during a single fuel injection. The CPU 102 calculates the total injection count and then proceeds to step S30.

In step S30, the CPU 102 distributes the total injection count to the intake stroke and the compression stroke. The number of times of injections distributed to the intake stroke is referred to as a first injection count. The number of times of injections distributed to the compression stroke is referred to as a second injection count. When the total injection count is an even number, the CPU 102 equally divides the total injection count into the intake stroke and the compression stroke. That is, the CPU 102 divides so that the first injection count is equal to the second injection count. When the total injection count is an odd number, the CPU 102 divides so that the first injection count is greater than the second injection count by one and the sum of the first injection count and the second injection count is equal to the total injection count. Subsequently, the CPU 102 proceeds to step S40. In other words, the first injection count is the number of times of injections distributed to the first injection range A. The first injection count is a base value of the number of times the injector 50 injects fuel in the first injection range A in which the base value is required for injecting the total injection amount during one cycle of the internal combustion engine 10. The second injection count is the number of times of injections distributed to the second injection range B. Thus, the second injection count is a base value of the number of times the injector 50 injects fuel in the second injection range B in which the base value is required for injecting the total injection amount is injected during one cycle of the internal combustion engine 10. The process in step S30 and a first preparation process in step S110, which will be described later, are included in a base value calculating process.

In step S40, the CPU 102 executes the first preparation process. In the first preparation process, the CPU 102 determines a target start timing and a target injection amount of each injection when the injector 50 injects fuel in the intake stroke. The first preparation process will be described later in detail. Subsequently, the CPU 102 proceeds to step S50.

In step S50, the CPU 102 executes a second preparation process. In the second preparation process, the CPU 102 determines a target start timing and a target injection amount of each injection when the injector 50 injects fuel in the compression stroke. The second preparation process will be described later in detail. After completing the process in step S50, the CPU 102 executes steps S60 and S70. After step S50 is completed, steps S60 and S70 are executed on all of the cylinders 11 that reach the start time M1 of the intake stroke until step S50 is completed in the next cycle of the specific injection control. Hence, steps S60 and S70 may be sequentially executed on the cylinders 11. However, for the sake of brevity, steps S60 and S70 will be described as a series of processes executed on one of the cylinders 11.

In step S60, the CPU 102 executes the first injection process. More specifically, the CPU 102 causes the injector 50 to inject fuel in the first injection range A in accordance with the target start timings and the target injection amounts determined in the first preparation process. That is, the CPU 102 repeats waiting for each target start timing, which is determined in the first preparation process, and controlling the injector 50 so that the injector 50 injects the target injection amount of fuel triggered by the target start timing. When the first injection count determined in step S30 is one, the CPU 102 causes the injector 50 to perform fuel injection only one time. When the fuel injection of the total injection amount distributed to the intake stroke is completed, the CPU 102 proceeds to step S70.

In step S70, the CPU 102 executes the second injection process. More specifically, the CPU 102 causes the injector 50 to inject fuel in the second injection range B in accordance with the target start timings and the target injection amounts determined in the second preparation process. That is, the CPU 102 repeats waiting for each target start timing, which is determined in the second preparation process, and controlling the injector 50 so that the injector 50 injects the target injection amount of fuel triggered by the target start timing. In the same manner as the first injection process, when the second injection count determined in step S30 is one, the CPU 102 causes the injector 50 to perform fuel injection only one time. When fuel injection of the total injection amount distributed to the compression stroke is completed, the CPU 102 ends a series of processes of the specific injection control. Subsequently, when the execution condition is satisfied, the CPU 102 again executes the specific injection control.

First Preparing Process

Figure 4:
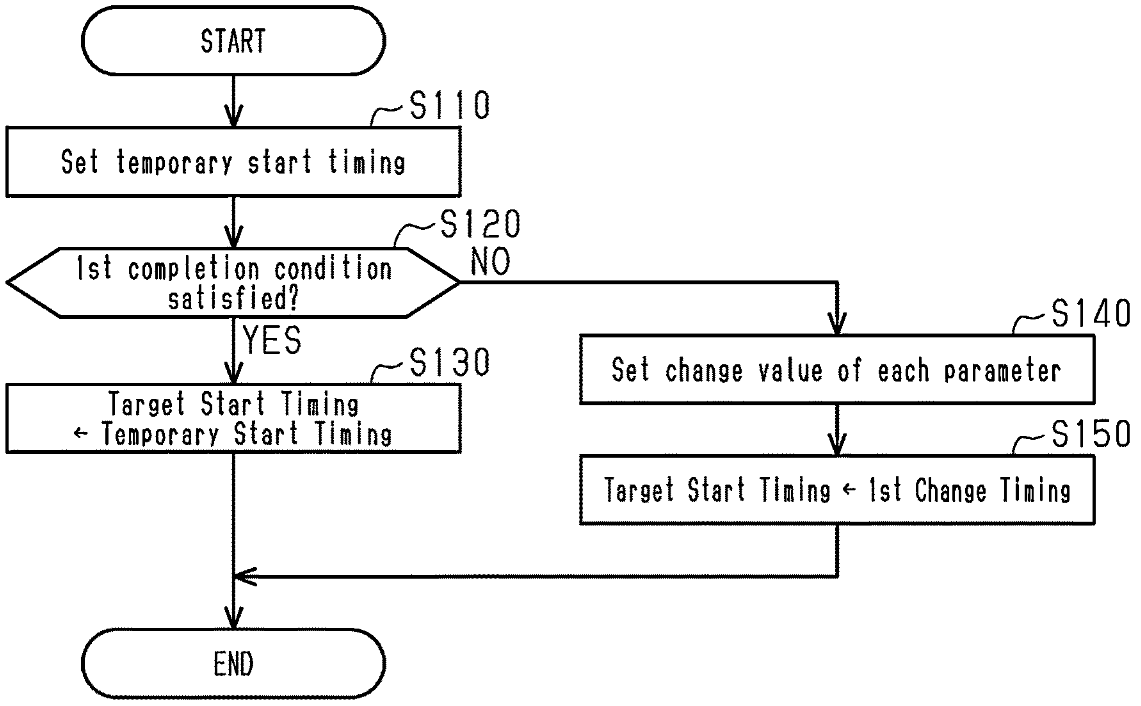
FIG. 4 is a flowchart showing the procedure of a process of a first preparation process.

The specific procedure of the first preparation process will now be described. As shown in FIG. 4, when starting the first preparation process, the CPU 102 executes step S110. In step S110, the CPU 102 sets a temporary start timing of each injection when the injector 50 injects fuel in the intake stroke. The CPU 102 divides the total injection amount calculated in step S10 by the total injection count calculated in step S20 to calculate a base injection amount. The base injection amount is a base value of a fuel injection amount injected by the injector 50 per injection that is necessary for injecting the total injection amount during one cycle of the internal combustion engine 10. The CPU 102 calculates a fuel injection period per injection necessary for each fuel injection. The CPU 102 also converts the fuel injection period into a necessary crank interval, which is a crank angular range corresponding to the engine rotational speed at the present time.

The CPU 102 also converts a base injection interval stored in the memory 104 into a base crank interval, which is a crank angular range corresponding to the engine rotational speed at the present time. The base injection interval is a base value of a time interval, in two consecutive fuel injections, from the end timing of the first fuel injection to the start timing of the second fuel injection. The base injection interval is determined to be a time that allows each fuel injection to be performed while minimizing a load on an electric system that drives the injectors 50.

When the base crank interval is calculated, the CPU 102 determines a temporary start timing of each fuel injection in the first injection count determined in step S30. More specifically, the CPU 102 sets the temporary start timing for the initial fuel injection to the start A1 of the first injection range A.

Then, the CPU 102 sets the temporary start timing for the second fuel injection and subsequent fuel injections. More specifically, the CPU 102 sequentially determines the temporary start timing for each fuel injection such that the temporary start timing for the next fuel injection is retarded from the temporary start timing for the previous fuel injection by the length of the sum of the necessary crank interval and the base crank interval. When the first injection count determined in step S30 is one, the CPU 102 sets the start timing for this fuel injection to the start A1 of the first injection range A. When the temporary start timing of each fuel injection is set, the CPU 102 proceeds to step S120.

In step S120, the CPU 102 determines whether a first completion condition is satisfied if the fuel is injected at the temporary start timing determined in step S110. In other words, the CPU 102 determines whether the first completion condition is satisfied under a first assumption that the base injection amount, that is, the fuel injection amount per injection in the first injection range A, is injected at the first injection count. The first completion condition refers to completion of fuel injection of a first total amount within the first injection range A. The first total amount is a total fuel injection amount distributed to the intake stroke, more specifically, the first injection range A. The first total amount is the product of the first injection count and the base injection amount, which is the fuel injection amount per injection calculated in step S110. Thus, the first total amount is a value determined by the base injection amount and the first injection count.

As a specific process of step S120, the CPU 102 calculates a completing timing of the final fuel injection among fuel injection of the first injection count. More specifically, the CPU 102 refers to the temporary start timing for the final fuel injection among the temporary start timings of the first injection count determined in step S110. The CPU 102 calculates a timing that is retarded from the temporary start timing by the necessary crank interval as the completing timing. The CPU 102 compares the completing timing and the end A2 of the first injection range A. When the completing timing is the same as the end A2 of the first injection range A or is located at a side advanced from the end A2 of the first injection range A, the CPU 102 determines that the first completion condition is satisfied under the first assumption (step S120: YES). In this case, the CPU 102 proceeds to step S130. The process of step S120 corresponds to a first determination process.

As described above, to set the temporary start timing of each fuel injection in the first injection count in step S110, the CPU 102 sets the temporary start timing for the initial fuel injection to the start A1 of the first injection range A. Thus, the temporary start timings of fuel injections in the first injection count entirely tend to be advanced in the first injection range A. Because of this tendency, when an affirmative determination is made in step S120, the following first count condition is generally satisfied. The first count condition refers to fuel injection at a retard side with respect to the crank angle corresponding to the center of the first injection range A being started fewer times than at an advance side with respect to the crank angle corresponding to the center of the first injection range A.

In step S130, the CPU 102 sets the target start timing for each injection when the injector 50 injects fuel in the intake stroke. More specifically, the CPU 102 sets the target start timing for each fuel injection to the temporary start timing determined in step S110. In step S130, the CPU 102 also sets the target injection amount injected from the injector 50 triggered by the target start timing to the base injection amount calculated in step S110. Then, the CPU 102 ends the first preparation process.

In step S120, when the completing timing of the final fuel injection is located at a side retarded from the end A2 of the first injection range A, the CPU 102 determines that the first completion condition is not satisfied under the first assumption (step S120: NO). In this case, the CPU 102 proceeds to step S140.

In step S140, the CPU 102 sets a change value of each parameter when the injector 50 injects fuel in the intake stroke. The parameters include the injection count, the injection start timing, and the fuel injection amount per injection by the injector 50. More specifically, the CPU 102 sets a first change count in which the injection count is changed from the first injection count, a first change timing in which the injection start timing is changed from the temporary start timing, and a first change injection amount in which the fuel injection amount per injection is changed from the base injection amount. The CPU 102 sets the first change count, the first change injection amount, and the first change timing corresponding to the first change count so that all of the following three conditions (X1), (X2), and (X3) are satisfied.

(X1) The product of the first change count and the first change injection amount is equal to the product of the first injection count and the base injection amount.

(X2) The first change count is less than the first injection count.

(X3) When the fuel injection amount per injection is the first change injection amount and fuel is injected in the first change count at the first change timing, the first completion condition is satisfied.

For the first change timing of each fuel injection, in the same manner as the temporary start timing, the CPU 102 determines the first change timing of each injection so that the fuel injections are started at a fixed interval while setting the start timing of the initial fuel injection to the start A1 of the first injection range A. When the change value of each parameter is determined so that all of the conditions are satisfied, the first change injection amount is greater than the base injection amount. More specifically, the CPU 102 recalculates the start timing of each injection from the temporary start timing in a manner such that the injection count in the first injection range A is decreased from the first injection count while increasing the fuel injection amount per injection. Then, the CPU 102 proceeds to step S150.

In step S150, the CPU 102 sets the target start timing for each fuel injection to the first change timing determined in step S140. Also, in step S150, the CPU 102 sets the target injection amount injected from the injector 50 triggered by the target start timing to the first change injection amount determined in step S140. Then, the CPU 102 ends the first preparation process. When the target start timing and the target injection amount of each fuel injection are determined by step S150, that is, when the first completion condition is not satisfied under the first assumption, the CPU 102 performs the following in the first injection process of step S60. The first change injection amount is the fuel injection amount per injection changed from the base injection amount so that injection of the first total amount completes in the first injection range A at the first change count, which is less than the first injection count. The CPU 102 causes the injector 50 to inject the first change injection amount of fuel at the first change count.

Second Preparing Process

Figure 5:
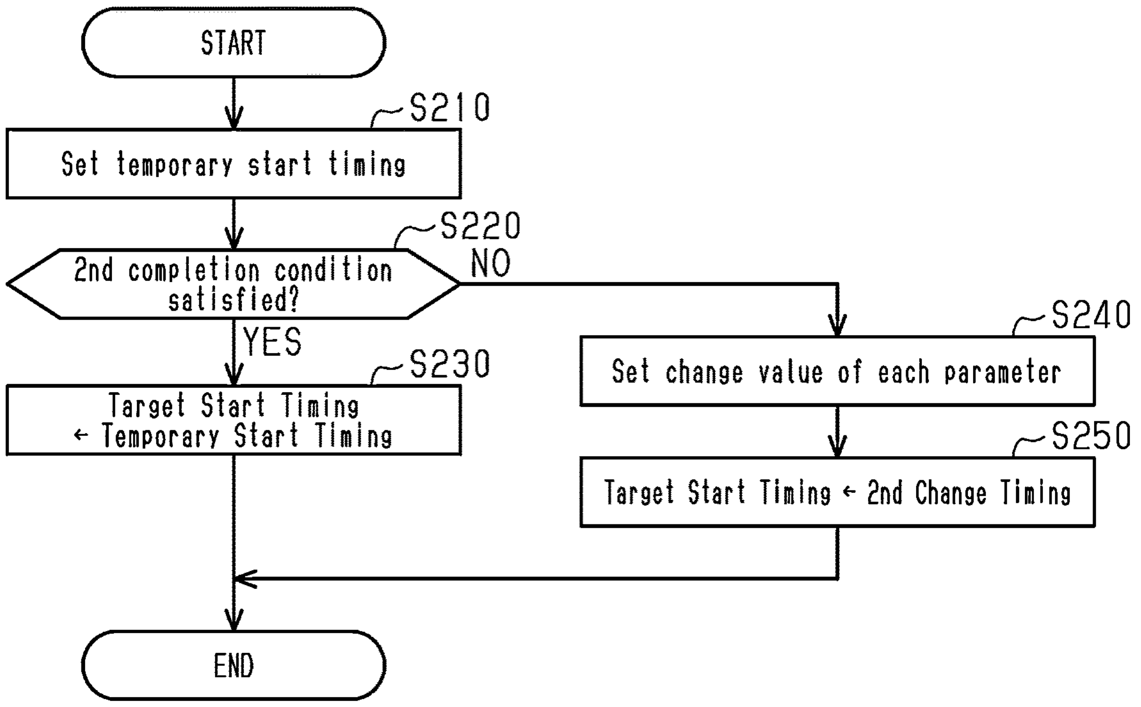
FIG. 5 is a flowchart showing the procedure of a process of a second preparation process.

The specific procedure of the second preparation process will now be described. As shown in FIG. 5, when starting the second preparation process, the CPU 102 executes step S210. In step S210, the CPU 102 sets a temporary start timing of each injection when the injector 50 injects fuel in the compression stroke. As a specific process of step S210, the CPU 102 determines a temporary start timing of the final fuel injection among fuel injections of the second injection count. More specifically, the CPU 102 sets the temporary start timing of the final fuel injection to a timing advanced from the end B2 of the second injection range B by the necessary crank interval.

Then, the CPU 102 sets a temporary start timing of the other fuel injections as follows. More specifically, the CPU 102 sequentially determines the temporary start timing for each fuel injection such that the temporary start timing of the previous fuel injection is set to a timing advanced by the length of the sum of the necessary crank interval and the base crank interval from the temporary start timing for the last fuel injection. Thus, the CPU 102 sets the temporary start timing for each fuel injection at a fixed interval so that the end timing of the final fuel injection coincides with the end B2 of the second injection range B. When the second injection count determined in step S30 is one, the CPU 102 sets the start timing of this fuel injection to a timing advanced from the end B2 of the second injection range B by the necessary crank interval. When the start timing of each fuel injection is set, the CPU 102 proceeds to step S220.

In step S220, the CPU 102 determines whether a second completion condition is satisfied if the fuel is injected at the temporary start timing determined in step S210. In other words, the CPU 102 determines whether the second completion condition is satisfied under a second assumption that the base injection amount, that is, the fuel injection amount per injection in the second injection range B, is injected at the second injection count. The second completion condition refers to completion of fuel injection of a second total amount within the second injection range B. The first total amount is a total fuel injection amount distributed to the compression stroke, more specifically, the first injection range A. The second total amount is the product of the second injection count and the base injection amount, which is calculated in step S110 of the first preparation process. Thus, the second total amount is a value determined by the base injection amount and the second injection count. As a specific process of step S220, of the temporary start timings in the second injection count determined by step S210, the CPU 102 compares the start timing of the initial fuel injection with the start B1 of the second injection range B. When the start timing is the same as the start B1 of the second injection range B or is located at a side retarded from the start B1 of the second injection range B, the CPU 102 determines that the second completion condition is satisfied under the second assumption (step S220: YES). In this case, the CPU 102 proceeds to step S230. The process of step S220 corresponds to the second determination process.

As described above, to set the temporary start timing of each fuel injection in the second injection count in step S210, the CPU 102 sets the end timing of the final fuel injection to coincide with the end B2 of the second injection range B. Thus, the temporary start timings of fuel injections in the second injection count entirely tend to be retarded in the second injection range B. Because of this tendency, when an affirmative determination is made in step S220, the following second count condition is generally satisfied. The second count condition refers to fuel injection at an advanced side with respect to the crank angle corresponding to the center of the second injection range B being started fewer times than at a retard side with respect to the crank angle corresponding to the center of the second injection range B.

In step S230, the CPU 102 sets the target start timing for each injection when the injector 50 injects fuel in the compression stroke. More specifically, the CPU 102 sets the target start timing for each fuel injection to the temporary start timing determined in step S210. In step S230, the CPU 102 also sets the target injection amount injected from the injector 50 triggered by the target start timing to the base injection amount calculated in the first preparation process. Then, the CPU 102 ends the second preparation process.

In step S220, when the start timing of the initial fuel injection is located at a side advanced from the start B1 of the second injection range B, the CPU 102 determines that the second completion condition is not satisfied under the second assumption (step S220: NO). In this case, the CPU 102 proceeds to step S240.

In step S240, the CPU 102 sets a change value of each parameter when the injector 50 injects fuel in the compression stroke. Types of parameters are the same as those in step S140 of the first preparation process. More specifically, the parameters include the injection count, the injection start timing, and the fuel injection amount per injection by the injector 50. More specifically, the CPU 102 sets a second change count in which the injection count is changed from the second injection count, a second change timing in which the injection start timing is changed from the temporary start timing, and a second change injection amount in which the fuel injection amount per injection is changed from the base injection amount. The CPU 102 satisfies the following three conditions (Y1), (Y2), and (Y3).

(Y1) The product of the second change count and the second change injection amount is equal to the product of the second injection count and the base injection amount.

(Y2) The second change count is less than the second injection count.

(Y3) When the fuel injection amount per injection is the second change injection amount and fuel is injected in the second change count at the first change timing, the second completion condition is satisfied.

For the second change timing of each fuel injection, in the same manner as the determination of the temporary start timing in step S210, the CPU 102 determines the second change timing of each injection so that the fuel injections are started at a fixed interval while setting the end timing of the final fuel injection of to the end B2 of the second injection range B. For the process of step S240, the CPU 102 recalculates the start timing of each injection from the temporary start timing in a manner such that the injection count in the second injection range B is decreased from the second injection count while increasing the fuel injection amount per injection. The CPU 102 executes step S240 and then proceeds to step S250.

In step S250, the CPU 102 sets the target start timing for each fuel injection to the second change timing determined in step S240. Also, in step S250, the CPU 102 sets the target injection amount injected from the injector 50 triggered by the target start timing to the second change injection amount determined in step S240. Then, the CPU 102 ends the second preparation process. When the target start timing and the target injection amount of each fuel injection are determined by step S250, that is, when the second completion condition is not satisfied under the second assumption, the CPU 102 performs the following in the second injection process of step S70. The second change injection amount is the fuel injection amount per injection changed from the base injection amount so that injection of the second total amount completes in the second injection range B at the first change count, which is less than the second injection count. The CPU 102 causes the injector 50 to inject the second change injection amount of fuel at the second change count.

First Operation of Embodiment

It is assumed that the CPU 102 is currently executing the specific injection control. It is also assumed that the total injection count calculated by the CPU 102 in step S20 is five. In this case, as shown in FIG. 2, the CPU 102 executes step S30 so that the injection count in the intake stroke is three, and the injection count in the compression stroke is two. In step S40, the CPU 102 executes the first preparation process to set start timings for the three fuel injections in the first injection range A so that the fuel injection is started a greater number of times at an advance side with respect to the crank angle corresponding to the center of the first injection range A.

In step S60, the CPU 102 executes the fuel injection triggered by each start timing. In step S50, the CPU 102 executes the second preparation process to set start timings for the two fuel injections in the second injection range B so that the fuel injection is started a greater number of times at a retard side with respect to the crank angle corresponding to the center of the second injection range B.

Figure 6:
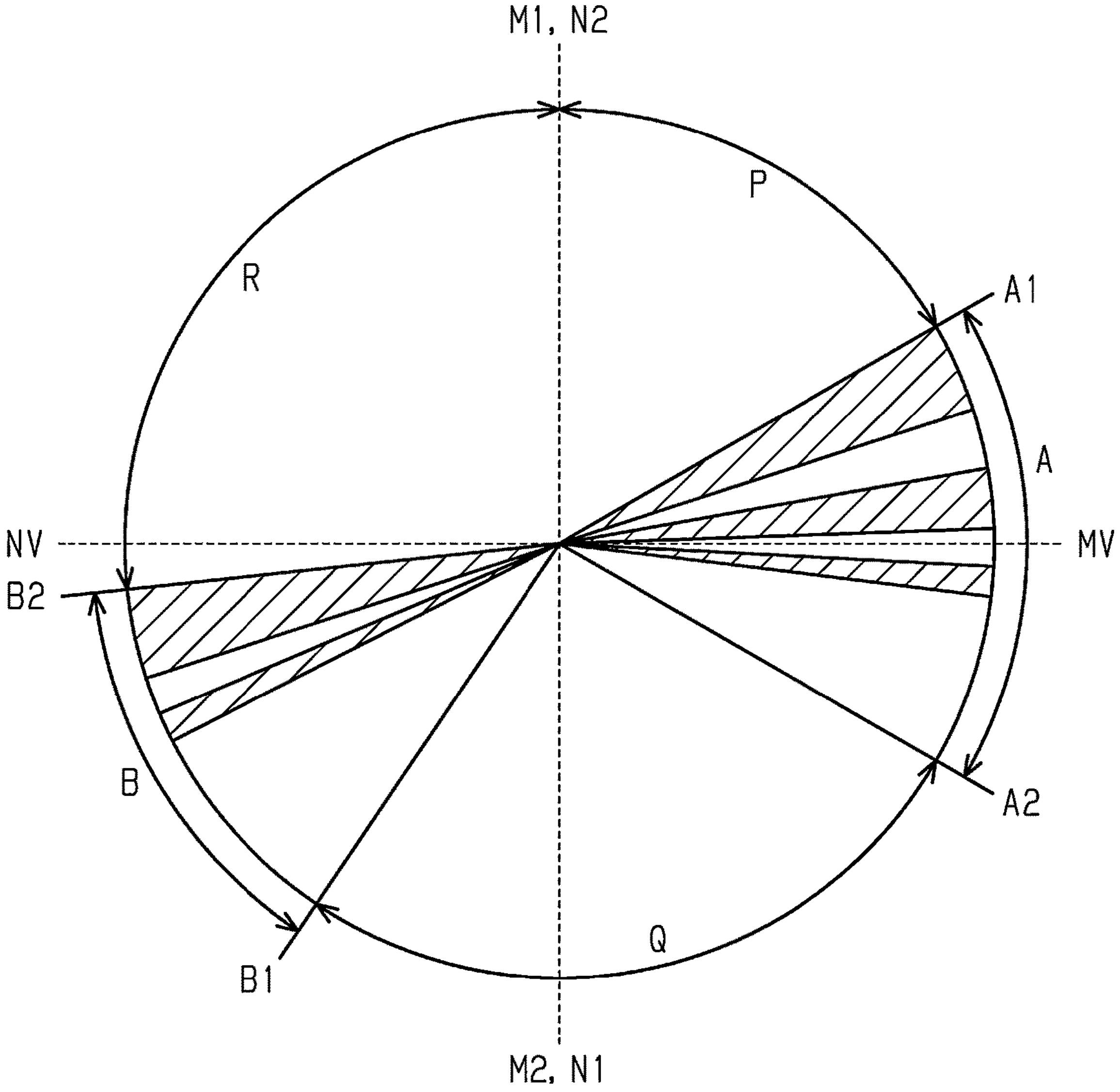
FIG. 6 is a schematic diagram showing a modified example of an injection pattern.
Figure 7:
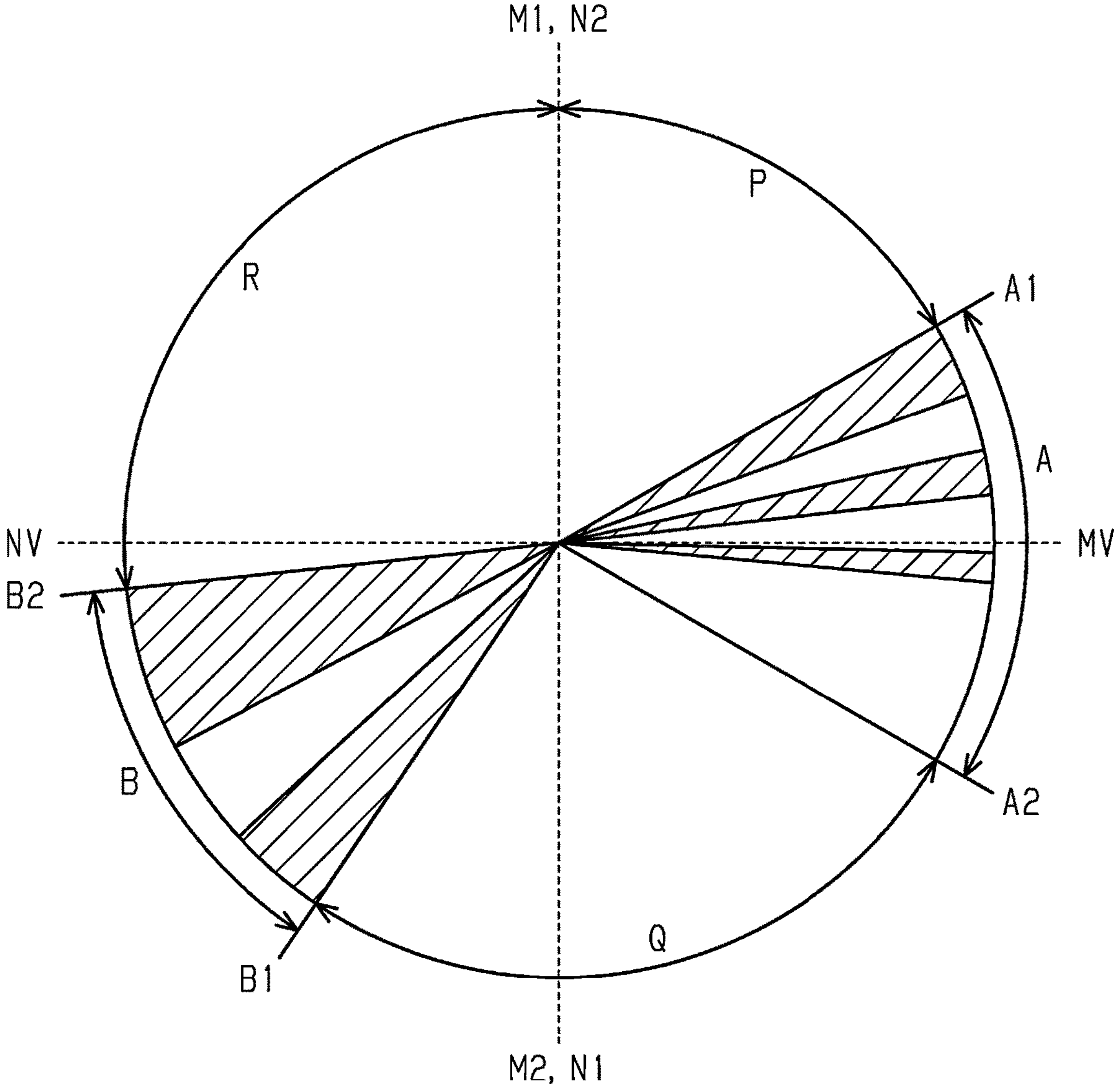
FIG. 7 is a schematic diagram showing a modified example of an injection pattern.

In step S70, the CPU 102 executes the fuel injections triggered by each start timing. In FIG. 2, each crank angular range in which a fuel injection is executed is indicated by hatching lines. The same applies to FIGS. 6 and 7, which will be described later. FIGS. 2, 6, and 7 are diagrams for facilitating understanding of the features of each injection pattern and do not necessarily reflect the actual injection amounts and the actual injection intervals.

Second Operation of Embodiment

When the temperature inside the cylinder 11 is relatively low, the fuel injected from the injector 50 is less likely to vaporize. If fuel is injected from the injectors 50 without taking any measures, the amount of fuel collected on the top surface 12A of the piston 12 and the wall surface 11A of the cylinder 11 may be increased. When the temperature inside the cylinder 11 is relatively low, the CPU 102 executes the specific injection control. In the specific injection control, the CPU 102 causes the injector 50 in a cylinder 11 to perform fuel injection multiple times during one cycle of the internal combustion engine 10. Thus, the CPU 102 reduces the fuel injection amount per fuel injection. This limits the fuel from reaching the top surface 12A of the piston 12 and the wall surface 11A of the cylinder 11.

In the present embodiment, to execute such multi-time fuel injection, the first injection range A and the second injection range B, in which fuel injection of the injector 50 is permitted, are determined taking into consideration the amount of fuel collected on the top surface 12A of the piston 12 and the wall surface 11A of the cylinder 11 in accordance with the position of the piston 12. As described above, when the injector 50 injects fuel, as the piston 12 is located closer to top dead center, the amount of fuel collected on the top surface 12A of the piston 12 is increased. Taking into consideration this general aspect and the movement direction of the piston 12, the start A1 of the first injection range A and the end B2 of the second injection range B are determined. More specifically, in the intake stroke, the piston 12 moves from top dead center toward bottom dead center. That is, in the intake stroke, the piston 12 moves away from the injector 50.

In contrast, in the compression stroke, the piston 12 moves from bottom dead center toward top dead center. That is, in the compression stroke, the piston 12 moves toward the injector 50. If the injector 50 injects fuel under a state in which the piston 12 is located at the same position in the intake stroke and the compression stroke, it takes the fuel injected from the injector 50 a shorter time to reach the piston 12 in the compression stroke. In the compression stroke, while the fuel moves in the cylinder 11, the piston 12 is moving toward the fuel. Therefore, based on the background, to decrease the amount of fuel collected on the top surface 12A of the piston 12, the injector 50 needs to complete fuel injection when the piston 12 is located closer to bottom dead center in the compression stroke than in the intake stroke. Hence, the end B2 of the second injection range B is located closer to the end time M2 of the intake stroke, at which the piston 12 is located at bottom dead center, than the start A1 of the first injection range A is.

Also, when the injector 50 injects fuel, as described above, as the piston 12 is located closer to bottom dead center, the amount of fuel collected on the wall surface 11A of the cylinder 11 is increased. Taking into consideration this general aspect and the in-cylinder pressure, the end A2 of the first injection range A and the start B1 of the second injection range B are determined.

More specifically, in the compression stroke, as the cylinder pressure gradually increases, the temperature of gas in the cylinder 11 increases. Thus, in the compression stroke, vaporization of fuel injected from the injector 50 is facilitated. Therefore, in the compression stroke, even when the piston 12 is located closer to bottom dead center than in the intake stroke and the injector 50 injects fuel, the fuel reaching the wall surface 11A of the cylinder 11 is limited. In the compression stroke, the fuel may vaporize before reaching the wall surface 11A of the cylinder 11.

Based on the background, to decrease the amount of fuel collected on the wall surface 11A of the cylinder 11, the injector 50 is permitted to start fuel injection when the piston 12 is located closer to bottom dead center in the compression stroke than in the intake stroke. The start B1 of the second injection range B is located closer to the end time M2 of the intake stroke than the end A2 of the first injection range A is.

Advantages of Embodiment (1) In the present embodiment, the first injection range A is discontinuous with the second injection range B. Thus, the injector 50 does not perform fuel injection in a specified range including at least bottom dead center of the piston 12. More specifically, the injector 50 does not perform fuel injection when the exposed area of the wall surface 11A of the cylinder 11 is maximum. Thus, as compared to when fuel injection is performed with the piston 12 located at bottom dead center, collection of fuel on the wall surface 11A of the cylinder 11 is limited.

During a period from the start time N1 of the compression stroke to the end time N2 of the compression stroke, the piston 12 gradually moves to the side corresponding to top dead center. As described in the second operation of the embodiment, in the compression stroke, the fuel injected from the injector 50 is more likely to reach the top surface 12A of the piston 12 than in the intake stroke. In this regard, in the present embodiment, since the second injection range B is set to be narrower, a large amount of fuel is not likely to be injected in the compression stroke. Thus, collection of the large amount of fuel on the top surface 12A of the piston 12 is avoided.

(2) The amount of unburned hydrocarbon increases as the piston 12 is located closer to bottom dead center when fuel is injected. More specifically, the amount of unburnt hydrocarbon linearly increases in accordance with the position of the piston 12. The amount of particulate matter increases as the piston 12 is located closer to top dead center when fuel is injected. More specifically, the amount of particulate matter exponentially increases in accordance with the position of the piston 12. Taking into consideration the exponential increase in the amount of particulate matter, it is necessary to maximize the crank angular range in which fuel injection is prohibited when the piston 12 is located at the side corresponding to top dead center.

In this regard, in the present embodiment, the sum of the first predetermined range P and the third predetermined range R, in which fuel injection is prohibited, is greater than the second predetermined range Q. This configuration is very effective in decreasing the amount of particulate matter.

(3) As described in the second operation of the embodiment, taking into consideration the movement direction of the piston 12, in the compression stroke, fuel injection needs to be completed when the piston 12 is located farther away from top dead center than in the intake stroke. In contrast, in the intake stroke, fuel injection is permitted even when the piston 12 is located relatively close to top dead center. Therefore, as in the present embodiment, when the end B2 of the second injection range B is located closer to the end time M2 of the intake stroke than the start A1 of the first injection range A is, the crank angular range in which fuel injection is permitted is maximized while the amount of fuel collected on the top surface 12A of the piston 12 is decreased.

(4) As described in the second operation of the embodiment, taking into consideration the movement direction of the piston 12, in the compression stroke, fuel injection is permitted when the piston 12 is located closer to bottom dead center than in the intake stroke. Therefore, as in the present embodiment, when the start B1 of the second injection range B is located closer to the end time M2 of the intake stroke than the end A2 of the first injection range A is, the crank angular range in which fuel injection is permitted is maximized while the amount of fuel collected on the wall surface 11A of the cylinder 11 is decreased.

(5) In the present embodiment, in the first injection process, the CPU 102 generally starts fuel injection at a retard side with respect to the crank angle corresponding to the center of the first injection range A fewer times than at an advance side with respect to the crank angle corresponding to the center of the first injection range A. In the second injection process, the CPU 102 generally starts fuel injection at an advance side with respect to the center of the second injection range B fewer times than at a retard side with respect to the center of the second injection range B. Thus, in the present embodiment, when the piston 12 is located close to bottom dead center, the fuel injection count is decreased. In the present embodiment, the amount of fuel collected on the wall surface 11A of the cylinder 11 is decreased.

As described in the advantage (2), in the present embodiment, the crank angular range in which fuel injection of the injector 50 is prohibited is widened at the side corresponding to top dead center. This strictly limits the amount of particulate matter that is produced, that is, the amount of fuel collected on the top surface 12A of the piston 12. Furthermore, as described above, when the piston 12 is located close to bottom dead center, the fuel injection count is decreased. This also strictly limits the amount of fuel collected on the wall surface 11A of the cylinder 11.

(6) In an example, when the engine load rate is increased, the total injection amount of fuel necessary in one cycle of the internal combustion engine 10 is increased. Accordingly, if the injector 50 injects the base injection amount of fuel per injection, the injector 50 may fail to accomplish injection of the first total amount, which is the total fuel injection amount distributed to the intake stroke, more specifically, the first injection range A, in the first injection range A. In this regard, in the present embodiment, when the first completion condition is not satisfied under the first assumption, the fuel injection amount per injection is recalculated so that the first total amount is injected in the first injection range A. This ensures that the amount of fuel necessary in the intake stroke is injected in the first injection range A while decreasing the amount of fuel collected on the top surface 12A of the piston 12 and the wall surface 11A of the cylinder 11. Also, in the present embodiment, it is ensured that the amount of fuel necessary in the compression stroke is injected in the second injection range B while decreasing the amount of fuel collected on the top surface 12A of the piston 12 and the wall surface 11A of the cylinder 11.

Modified Examples

The embodiments described above may be modified as follows. The embodiments and the following modified examples may be combined as long as the combined modified examples remain technically consistent with each other.

In the first preparation process, the process of step S140 is not limited to that in the embodiment described above. In step S140, the injection count, the injection start timing, and the fuel injection amount per injection may be adjusted so that injection of the total amount of the fuel injection amount distributed to the intake stroke, more specifically, the first injection range A, completes in the first injection range A. In this case, each parameter may be adjusted so that, for example, the first count condition is satisfied. In an example, the fuel injection amount per injection does not have to be the same and may vary. In the second preparation process, the process of step S240 may be changed in the same manner. In step S240, each parameter may be adjusted so that injection of the total amount of the fuel injection amount distributed to the compression stroke, more specifically, the second injection range B, completes in the second injection range B.

The entirety of the first preparation process is not limited to that in the embodiment described above. As will be described later, the first determination process may be omitted from the first preparation process. In the first preparation process, when the injector 50 performs fuel injections in the first injection process, the target start timing of each injection and the target injection amount injected by the injector 50 triggered by the target start timing may be determined. In an example, as in the embodiment, instead of temporarily setting the temporary start timing and then setting the target start timing, the target start timing may be set as well as the target injection amount by an initial adjustment that satisfies the first completion condition. More specifically, the CPU 102 sets the target injection amount and the target start timing of each fuel injection by reverse calculation of the total amount of the fuel injection amount distributed to the intake stroke and the injection count so that injection of the total amount completes in the first injection range A. In this case, the target injection amount of each fuel injection may differ from that of the other fuel injections. Alternatively, the target injection amount of some fuel injections may differ from that of the other fuel injections. In addition, the interval from the end timing of a first fuel injection to the start timing of a second fuel injection in two consecutive fuel injections may differ from that of the other two consecutive fuel injections. Alternatively, the interval may differ among only some of the fuel injections. The first count condition may be satisfied but does not necessarily have to be satisfied.

For example, when the target injection amount of each fuel injection may differ from that of the other fuel injections, as shown in FIG. 6, the target injection amount of fuel injections in the first injection range A may be decreased as the fuel injection is performed at a position closer to the retard side. In this case, the CPU 102 may set the target start timing for each of the fuel injections by setting, for example, the target start timing of the initial fuel injection to the start A1 of the first injection range A. The CPU 102 may set the target start timing for the second and subsequent fuel injections while using a different interval from the end timing of the fuel injection to the start timing of the fuel injection in each fuel injection. When the first injection process is executed in accordance with the target injection amount and the target start timing that are set as described above, the fuel per injection injected by the injector 50 is decreased as the piston 12 is located closer to bottom dead center. This decreases the amount of fuel collected on the wall surface 11A of the cylinder 11.

In the example shown in FIG. 6, the target injection amount of each fuel injection differs from that of the other fuel injection in the first injection range A. However, even without satisfying a relationship such that the target injection amount is decreased as fuel injection is performed at a retard side in the first injection range A, the effect in decreasing the amount of fuel collected on the wall surface 11A of the cylinder 11 is obtained as long as the following first fuel amount condition is satisfied. The first fuel amount condition refers to a condition in which the injector 50 performs fuel injection multiple times in the same first injection range A so that the amount of fuel injected at the final fuel injection in the first injection range A is less than the amount of fuel injected at the initial fuel injection in the first injection range A.

As described above, the first preparation process may be changed from that in the embodiment described above. In the first preparation process, the injection count, the injection start timing, and the fuel injection amount per injection may be set so that injection of the total amount of the fuel injection amount distributed to the intake stroke, more specifically, the first injection range A, completes in the first injection range A. Regardless of setting the temporary start timing, both the first count condition and the first fuel amount condition may be satisfied, only one of the two conditions may be satisfied, or neither of the two conditions may be satisfied.

In the first injection process, the setting of the first preparation process is reflected. Thus, the first injection process is changed depending on the setting of the first preparation process. That is, when the injector 50 performs fuel injection in the first injection process, the fuel injection amount and the injection start timing of each fuel injection may be changed. In the first injection process, the start timing of the initial fuel injection does not have to be the start A1 of the first injection range A.

In the same manner as the first preparation process, the entirety of the second preparation process is not limited to that in the embodiment described above. In the second preparation process, when the injector 50 performs fuel injections in the second injection process, the target start timing of each injection and the target injection amount injected by the injector 50 triggered by the target start timing may be determined. In an example, in the same manner as the first preparation process, in the second preparation process, the setting of the temporary start timing, more specifically, the second determination process, may be omitted. The target start timing may be set as well as the target injection amount by an initial adjustment that satisfies the second completion condition. More specifically, the CPU 102 sets the target injection amount and the target start timing of each fuel injection by reverse calculation of the total amount of the fuel injection amount distributed to the compression stroke and the injection count so that injection of the total amount completes in the second injection range B. When using the configuration described above, for example, as shown in FIG. 6, the CPU 102 may decrease the target injection amount of fuel as fuel injection is performed in the second injection range B at a more advanced side. In this state, for example, the CPU 102 may set the target start timing for each of the fuel injections so that the end timing of the final one of the fuel injections coincides with the end B2 of the second injection range B. When the second injection process is executed in accordance with the target injection amount and the target start timing that are set as described above, the fuel per injection injected by the injector 50 is decreased as the piston 12 is located closer to bottom dead center. This decreases the amount of fuel collected on the wall surface 11A of the cylinder 11.

In the example shown in FIG. 6, the target injection amount of each fuel injection in the second injection range B may differ from those of the other fuel injections. However, even without satisfying a relationship such that the target injection amount is decreased as fuel injection is performed at a more advance side in the second injection range B, the effect in decreasing the amount of fuel collected on the wall surface 11A of the cylinder 11 is obtained as long as the following second fuel amount condition is satisfied. The second fuel amount condition refers to a condition in which the injector 50 performs fuel injection multiple times in the same second injection range B so that the amount of fuel injected at the initial fuel injection in the second injection range B is less than the amount of fuel injected at the final fuel injection in the second injection range B.

As described above, the second preparation process may be changed from that in the embodiment described above. In the second preparation process, the injection count, the injection start timing, and the fuel injection amount per injection may be set so that injection of the total amount of the fuel injection amount distributed to the compression stroke, more specifically, the second injection range B, completes in the second injection range B. Regardless of setting the temporary start timing, both the second count condition and the second fuel amount condition may be satisfied, only one of the two conditions may be satisfied, or neither of the two conditions may be satisfied.

In the second injection process, the setting of the second preparation process is reflected. Thus, the second injection process is changed depending on the setting of the second preparation process. That is, when the injector 50 performs fuel injection in the second injection process, the fuel injection amount and the injection start timing of each fuel injection may be changed. In the second injection process, the end timing of the final fuel injection does not necessarily have to coincide with the end B2 of the second injection range B.

The process for distributing the total injection count to the intake stroke and the compression stroke is not limited to that of the embodiment described above. Considering the fuel injection amount per injection injected by the injector 50, the number of times fuel is injected in each of the first injection range A and the second injection range B may be determined so that the necessary amount of fuel is injected. As described above, after the injection count is distributed to the intake stroke and the compression stroke, the injection count may be further adjusted.

The process for determining the total injection count is not limited to that of the embodiment described above. Any determination process may be used as long as the injection count is appropriately determined.

The determination of the total injection count may be omitted. The injection count of each of the intake stroke and the compression stroke may be initially determined in accordance with an operating state of the internal combustion engine 10 or the like.

The process for distributing the total injection amount to the intake stroke and the compression stroke is not limited to that of the embodiment described above. It is sufficient to distribute an amount of fuel that can be completely injected in each of the first injection range A and the second injection range B.

The process for distributing the total injection amount to the intake stroke and the compression stroke may be configured so that, for example, as shown in FIG. 7, the total injection amount distributed to the compression stroke may be greater than the total injection amount distributed to the intake stroke. The distributed injection amount may be divided and injected multiple times in each of the first injection range A and the second injection range B. In this case, for example, in the first injection range A, the fuel injection amount per injection may be decreased as the fuel injection is performed at a position closer to the retard side. The start timing of the initial fuel injection in the first injection range A may be the start A1 of the first injection range A.

For example, in the second injection range B, the CPU 102 may decrease the fuel injection amount per injection as the fuel injection is performed at a position closer to the advance side. In addition, the CPU 102 may perform fuel injection so that the end timing of the final fuel injection in the second injection range B coincides with the end B2 of the second injection range B and the start timing of the initial fuel injection of the second injection range B coincides with the start B1 of the second injection range B.

As described above, in the compression stroke, vaporization of fuel is facilitated due to the in-cylinder pressure. Thus, the fuel is less likely to reach the wall surface 11A of the cylinder 11. Hence, as in the modified example shown in FIG. 7, an increase in the total injection amount distributed to the compression stroke appropriately decreases the amount of fuel collected on the wall surface 11A of the cylinder 11. When the fuel is injected in the first injection range A and the second injection range B, the amount of fuel collected on the top surface 12A of the piston 12 is decreased. Thus, as described above, even when the total amount of fuel distributed to the compression stroke is increased, there is no concern about an increase in the amount of fuel collected on the top surface 12A of the piston 12.

The process for determining the injection count and the injection amount in the intake stroke and the compression stroke may be appropriately changed. It is sufficient to complete injection of the amount of fuel necessary in one cycle of the internal combustion engine 10 in the first injection range A and the second injection range B in accordance with torque necessary for the internal combustion engine 10.

The parameter for acquiring the temperature of the cylinder 11 is not limited to that in the embodiment. As an index of the temperature of the cylinder 11, a value of the intake air amount accumulated from a start of the internal combustion engine 10 may be used instead of the temperature of the coolant. Any parameter may be used as long as the temperature of the cylinder 11 is acquired. In accordance with the parameter used, the execution condition of the specific injection control may be changed.

The execution condition of the specific injection control is not limited to determining that the temperature of the cylinder 11 is low. The execution condition may be changed so that the specific injection control is executed as necessary not only when the temperature of the cylinder 11 is low.

The process for setting the first injection range A and the second injection range B is not limited to that in the embodiment described above. It is sufficient that the first injection range A is discontinuous with the second injection range B and that the second injection range B is narrower than the first injection range A.

The start B1 of the second injection range B does not necessarily have to be located closer to the end time M2 of the intake stroke than the end A2 of the first injection range A is. For example, the start B1 of the second injection range B and the end A2 of the first injection range A may be separated from the end time M2 of the intake stroke by the same distance.

The end B2 of the second injection range B does not necessarily have to be located closer to the end time M2 of the intake stroke than the start A1 of the first injection range A is. For example, the end B2 of the second injection range B and the start A1 of the first injection range A may be separated from the end time M2 of the intake stroke by the same distance.

The sum of the first predetermined range P and the third predetermined range R does not necessarily have to be greater than the second predetermined range Q. For example, the sum of the first predetermined range P and the third predetermined range R may be the same as the second predetermined range Q.

The memory 104 may store, in advance, pairs of the first injection range A and the second injection range B. For example, multiple pairs of the first injection range A and the second injection range B may be prepared in accordance with the operating state of the internal combustion engine 10. The first injection range A and the second injection range B may be changed in accordance with a difference in the operating state of the internal combustion engine 10.

The overall configuration of the internal combustion engine 10 is not limited to the example of the above embodiment. For example, the number of the cylinders 11 may be changed. Even when the number of the cylinders 11 is changed, one cycle of the internal combustion engine 10 refers to a period in which a cylinder 11 undergoes one intake stroke, one compression stroke, one combustion stroke, and one exhaust stroke. The cylinders 11 are not limited to those defined in the engine main body 10A. In an example, a tubular member may be accommodated in the engine main body 10A. The cylinder 11 may be defined by the inner circumferential surface of the tubular member. In this case, the inner circumferential surface of the tubular member includes the wall surface 11A of the cylinder 11. The injector 50 may be mounted on the internal combustion engine 10 to inject fuel into the cylinder 11 from the side corresponding to top dead center of the piston 12. That is, the injection port 54 of the injector 50 may be located at any position above top dead center of the piston 12. Inclination of the center axis of the injector 50 and the center axis of the cylinder 11 may be changed.

The controller controlling the injectors 50 may be separated from a controller controlling components of the internal combustion engine 10 other than the injectors 50.

The processing circuitry of the controller 100 may include any one of the following configurations (a), (b), and (c).

(a) The processing circuitry includes one or more processors that execute various processes in accordance with a computer program. The processor includes a CPU and a memory, such as a RAM and ROM. The memory stores program codes or instructions configured to cause the CPU to execute the processes. The memory, or a computer-readable medium, includes any type of medium that is accessible by general-purpose computers and dedicated computers.

(b) The processing circuitry includes one or more dedicated hardware circuits that execute various processes. Examples of the dedicated hardware circuits include an application specific integrated circuit (ASIC) and a field programmable gate array (FPGA).

(c) The processing circuitry includes a processor that executes part of various processes in accordance with a computer program and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An injector controller configured to control an injector performing fuel injection into a cylinder of an internal combustion engine from a side corresponding to top dead center of a piston, the injector controller comprising:

a processor; and a memory, wherein the memory is configured to store, as a crank angular range in which fuel injection from the injector is permitted, a first injection range specified in advance in a crank angular range from a start time of an intake stroke to an end time of the intake stroke and a second injection range specified in advance in a crank angular range from a start time of a compression stroke to an end time of the compression stroke, the processor is configured to execute a first injection process that causes the injector to perform fuel injection in the first injection range, and a second injection process that causes the injector to perform fuel injection in the second injection range, and the second injection range is discontinuous with the first injection range and is narrower than the first injection range, wherein the processor is configured to execute:

a total injection amount calculating process that calculates a total fuel injection amount for the cylinder during a single cycle of the internal combustion engine based on an operating state of the internal combustion engine;

a base value calculating process that calculates a base injection amount, a first injection count, and a second injection count for injecting the total injection amount during the single cycle of the internal combustion engine, the base injection amount being a base value of a fuel injection amount injected by the injector per injection, the first injection count being a base value of number of times the injector performs fuel injection in the first injection range, and the second injection count being a base value of number of times the injector performs fuel injection in the second injection range;

when a first completion condition refers to completion of injection of a first total amount within the first injection range, the first total amount being a total fuel injection amount determined from the base injection amount and the first injection count and redistributed to the first injection range, prior to executing the first injection process, a first determining process that determines whether the first completion condition is satisfied under a first assumption that the base injection amount, being a fuel injection amount per injection injected in the first injection range, is injected at the first injection count; and when a second completion condition refers to completion of injection of a second total amount within the second injection range, the second total amount being a total fuel injection amount determined from the base injection amount and the second injection count and redistributed to the second injection range, prior to executing the second injection process, a second determining process that determines whether the second completion condition is satisfied under a second assumption that the base injection amount, being a fuel injection amount per injection injected in the second injection range, is injected at the second injection count, wherein when the first completion condition is not satisfied under the first assumption, in the first injection process, the fuel injection amount per injection is changed from the base injection amount to a change value so that injection of the first total amount completes within the first injection range at a first change count that is less than the first injection count, and the injector injects fuel of the change value at the first change count, and when the second completion condition is not satisfied under the second assumption, in the second injection process, the fuel injection amount per injection is changed from the base injection amount to a change value so that injection of the second total amount completes within the second injection range at a second change count that is less than the second injection count, and the injector injects fuel of the change value at the second change count.

2. The injector controller according to claim 1, wherein a crank angular range from the start time of the intake stroke to a start of the first injection range is referred to as a first predetermined range, a crank angular range from an end of the first injection range to a start of the second injection range following the first injection range is referred to as a second predetermined range, a crank angular range from an end of the second injection range to an end time of the compression stroke is referred to as a third predetermined range, and a sum of the first predetermined range and the third predetermined range is greater than the second predetermined range.

3. The injector controller according to claim 1, wherein the end of the second injection range is located closer to the end time of the intake stroke than the start of the first injection range is.

4. The injector controller according to claim 1, wherein the start of the second injection range is located closer to the end time of the intake stroke than the end of the first injection range is.

5. The injector controller according to claim 1, wherein in the first injection process, fuel injection is started at a retard side with respect to a center of the first injection range fewer times than at an advance side with respect to the center of the first injection range.

6. The injector controller according to claim 1, wherein in the second injection process, fuel injection is started at an advance side with respect to a center of the second injection range fewer times than at a retard side with respect to the center of the second injection range.

7. The injector controller according to claim 1, wherein the first injection process includes causing the injector to perform multiple fuel injections in the same first injection range so that an amount of fuel injected by a final one of the fuel injections in the first injection range is less than an amount of fuel injected by an initial one of the fuel injections in the first injection range.

8. The injector controller according to claim 1, wherein the second injection process includes causing the injector to perform multiple fuel injections in the same second injection range so that an amount of fuel injected by an initial one of the fuel injections in the second injection range is less than an amount of fuel injected by a final one of the fuel injections in the second injection range.

* * * * *